March 29, 1949.  K. F. POTTER  2,465,604
MATERIAL HANDLING APPARATUS
Filed Sept. 30, 1944   10 Sheets-Sheet 2

INVENTOR
KENNETH F. POTTER
BY G. H. Braddock
ATTORNEY

March 29, 1949. K. F. POTTER 2,465,604
MATERIAL HANDLING APPARATUS
Filed Sept. 30, 1944 10 Sheets-Sheet 3

INVENTOR
KENNETH F. POTTER
BY
*W. H. Braddock*
ATTORNEY

March 29, 1949.　　　　K. F. POTTER　　　2,465,604
MATERIAL HANDLING APPARATUS

Filed Sept. 30, 1944　　　　　　　　　　　10 Sheets-Sheet 4

INVENTOR
KENNETH F. POTTER
BY
*G. H. Braddock*
ATTORNEY

March 29, 1949.  K. F. POTTER  2,465,604
MATERIAL HANDLING APPARATUS

Filed Sept. 30, 1944  10 Sheets-Sheet 5

INVENTOR
KENNETH F. POTTER
BY
G. H. Braddock
ATTORNEY

March 29, 1949.    K. F. POTTER    2,465,604
MATERIAL HANDLING APPARATUS
Filed Sept. 30, 1944    10 Sheets-Sheet 6

INVENTOR
KENNETH F. POTTER
BY
*G. H. Braddock*
ATTORNEY

March 29, 1949.   K. F. POTTER   2,465,604
MATERIAL HANDLING APPARATUS
Filed Sept. 30, 1944   10 Sheets-Sheet 7

INVENTOR
KENNETH F. POTTER
BY G. H. Braddock
ATTORNEY

March 29, 1949. K. F. POTTER 2,465,604
MATERIAL HANDLING APPARATUS
Filed Sept. 30, 1944 10 Sheets-Sheet 8

INVENTOR
KENNETH F. POTTER
BY G. H. Braddock
ATTORNEY

March 29, 1949.    K. F. POTTER    2,465,604
MATERIAL HANDLING APPARATUS
Filed Sept. 30, 1944    10 Sheets-Sheet 9

INVENTOR
KENNETH F. POTTER
BY G. H. Braddock
ATTORNEY

March 29, 1949.    K. F. POTTER    2,465,604
MATERIAL HANDLING APPARATUS
Filed Sept. 30, 1944    10 Sheets-Sheet 10
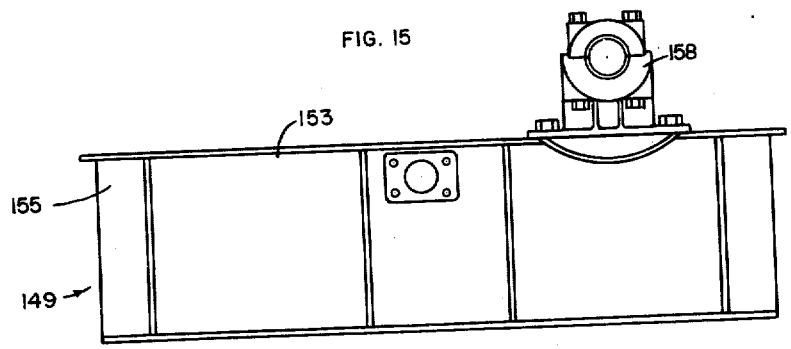
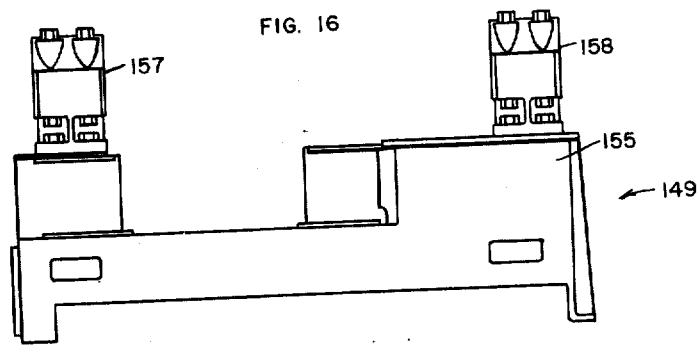
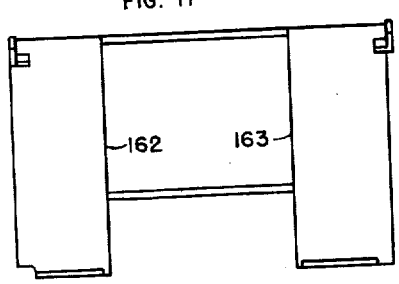
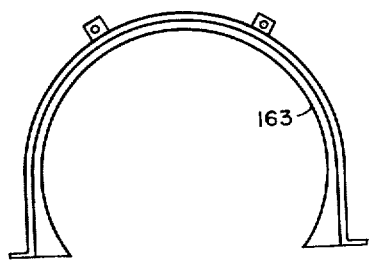
INVENTOR
KENNETH F. POTTER
BY *G. H. Braddock*
ATTORNEY Patented Mar. 29, 1949

2,465,604

UNITED STATES PATENT OFFICE 2,465,604

MATERIAL HANDLING APPARATUS

Kenneth F. Potter, St. Paul, Minn., assignor to American Hoist & Derrick Co., St. Paul, Minn., a corporation of Delaware Application September 30, 1944, Serial No. 556,572

8 Claims. (Cl. 254—187)

This invention has relation to material handling apparatus of the character including a winch. More explicitly, the invention relates to material handling apparatus, especially designed for use on cargo transporting vessels, of the type consisting of a cargo winch and mechanism, including electric motor, controller, control panel, resistors, brakes, etc., for effecting operation of said cargo winch.

An object of the invention is to provide material handling apparatus of the nature as set forth wherein will be incorporated various novel features and characteristics of construction designed to render the material handling apparatus an improvement generally over material handling apparatus heretofore known for accomplishing the same purposes.

A further object is to provide a material handling apparatus, consisting of a cargo winch and mechanism including electric motor, controller, control panel, resistors, a brake or brakes, etc., for actuating and regulating said cargo winch, which will include new and improved features and characteristics of construction designed with main purposes in view of (1) simplifying the structure of the material handling apparatus, thus to reduce the cost of building a cargo transporting vessel including the material handling apparatus, and of (2) conserving deck room, thus to provide increased cargo transporting space upon the vessel.

A further object is to provide in the material handling apparatus various improved features and characteristics of construction which will be novel both as individual entities of said material handling apparatus and in combination with each other.

And a further object is to provide a material handling apparatus of construction as hereinafter set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Figure 11:
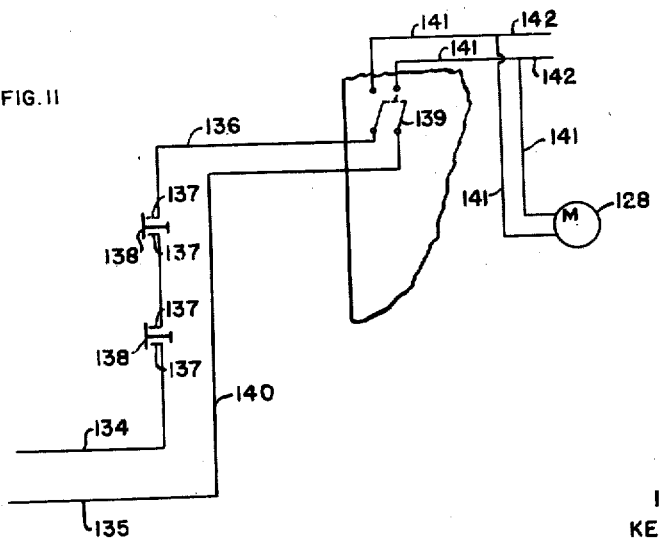
Figure 12:
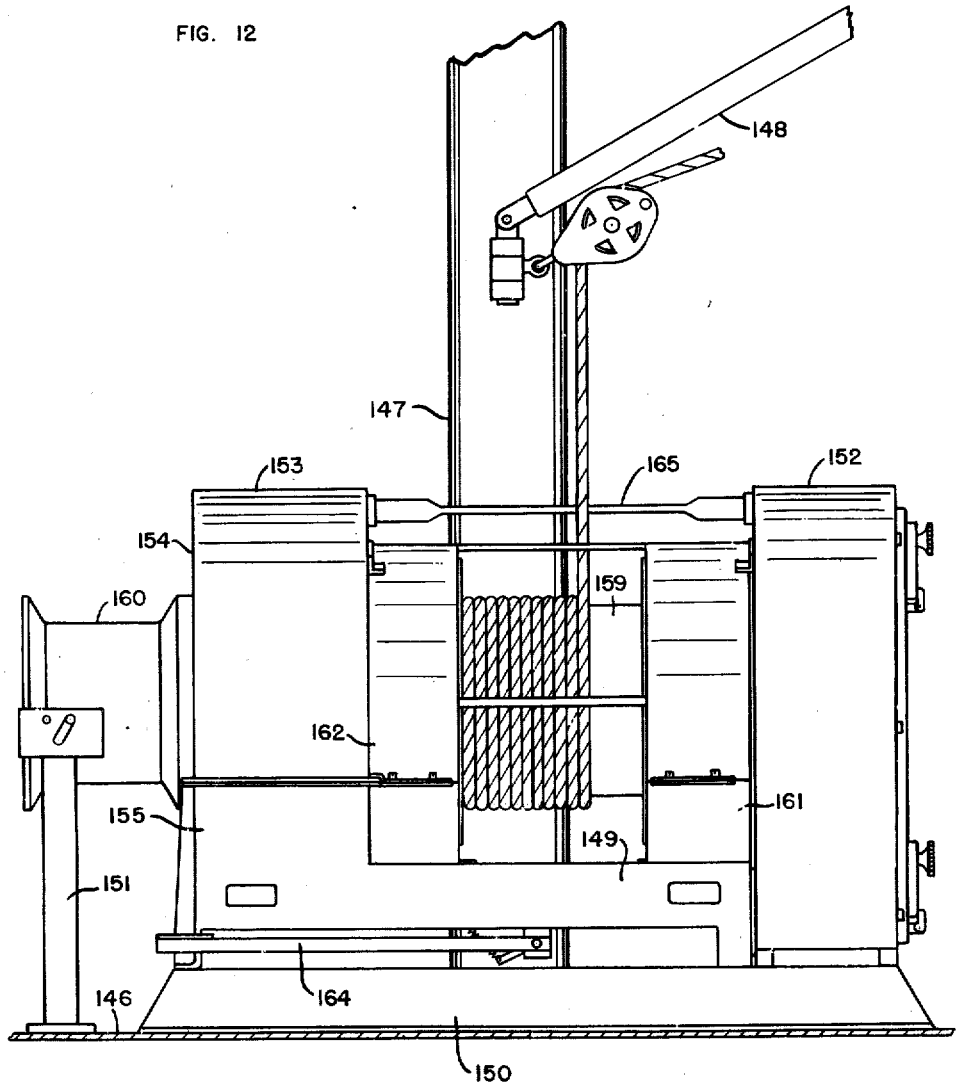
Figure 13:
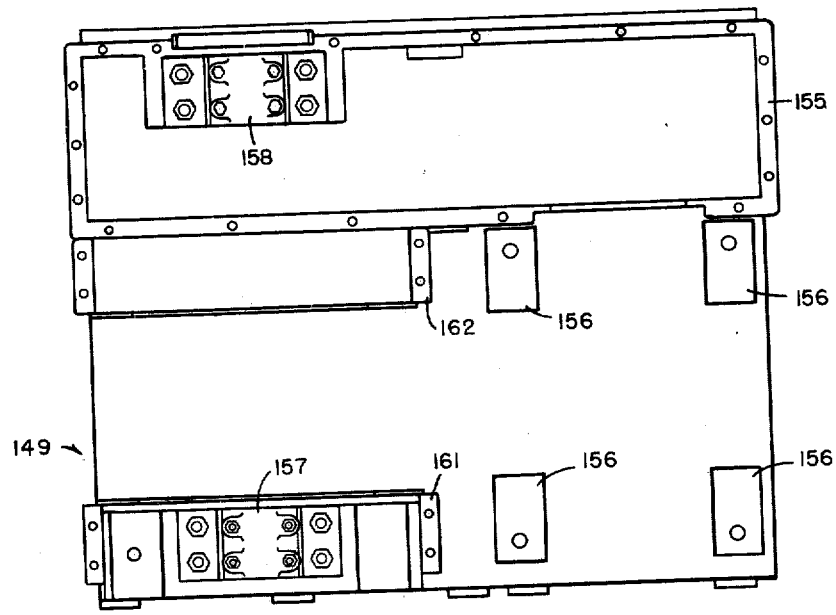
Figure 14:
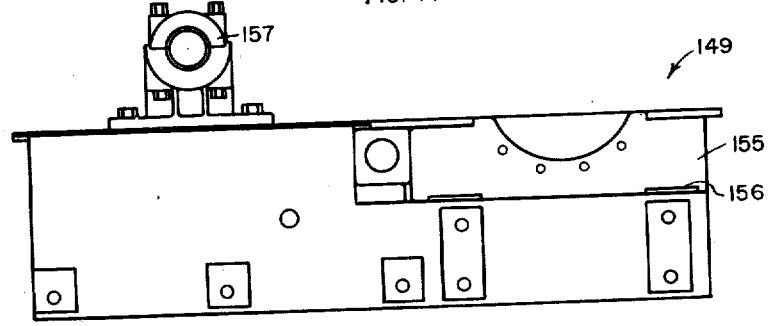

Fig. 11 discloses a wiring diagram;

Fig. 12 is an end elevational view of material handling apparatus of variant construction made according to the invention;

Fig. 13 is a plan view of winch bed construction of the material handling apparatus of Fig. 12;

Fig. 14 is a side elevational view of the winch bed construction of Fig. 13;

Fig. 15 is a side elevational view of the winch bed construction of Figs. 13 and 14 disclosing the side of said winch bed construction opposite that shown in Fig. 14;

Fig. 16 is an end elevational view of the winch bed construction of Figs. 13 to 15 as it would appear from the right in Figs. 13 and 14; and Figs. 17 and 18 are detail views of upper portions of guards of the material handling apparatus of Fig. 12.

With respect to Figs. 1 to 11 of the drawings and the numerals of reference thereon, 15 denotes the deck of a vessel, 16 a mast stationarily situated upon said deck, and 17 represents a boom suitably and conveniently pivotally supported, in ordinary or preferred manner, upon said mast.

The material handling apparatus here presented includes a cargo winch 18, a main electric motor 19, a controller 20, a control panel 21, resistors 22, an automatic brake 23 for the main electric motor 19, and a manual brake 24 for the cargo winch 18, as well as additional elements adapted to cooperate with the elements mentioned in a manner presently to be set forth. The control panel 21, the resistors 22 and the automatic brake 23 are all suitably and conveniently situated and supported within a watertight side frame housing 25 itself suitably and conveniently supported, as disclosed in Figs. 3 and 4, upon the deck 15. The controller 20 is suitably and conveniently supported upon said deck 15 at a location adjacent the cargo winch 18, the main electric motor 19, etc. Said main electric motor 19 is for the purpose of operating said cargo winch 18. The cargo winch 18 and the main electric motor 19 are situated at a side of the side frame housing 25, between said side frame housing 25 and an additional watertight side frame housing 26 of the material handling apparatus also suitably and conveniently supported, as disclosed in said Figs. 3 and 4, upon the deck 15. The side frame housings 25 and 26 are in spaced apart, parallel relation to each other, and a winch bed 27 of the material handling apparatus is situated between and is rigid with said side frame housings 25 and 26. The main electric motor 19 is fastened down, as at 28, upon the bed 27.

Figure 1:
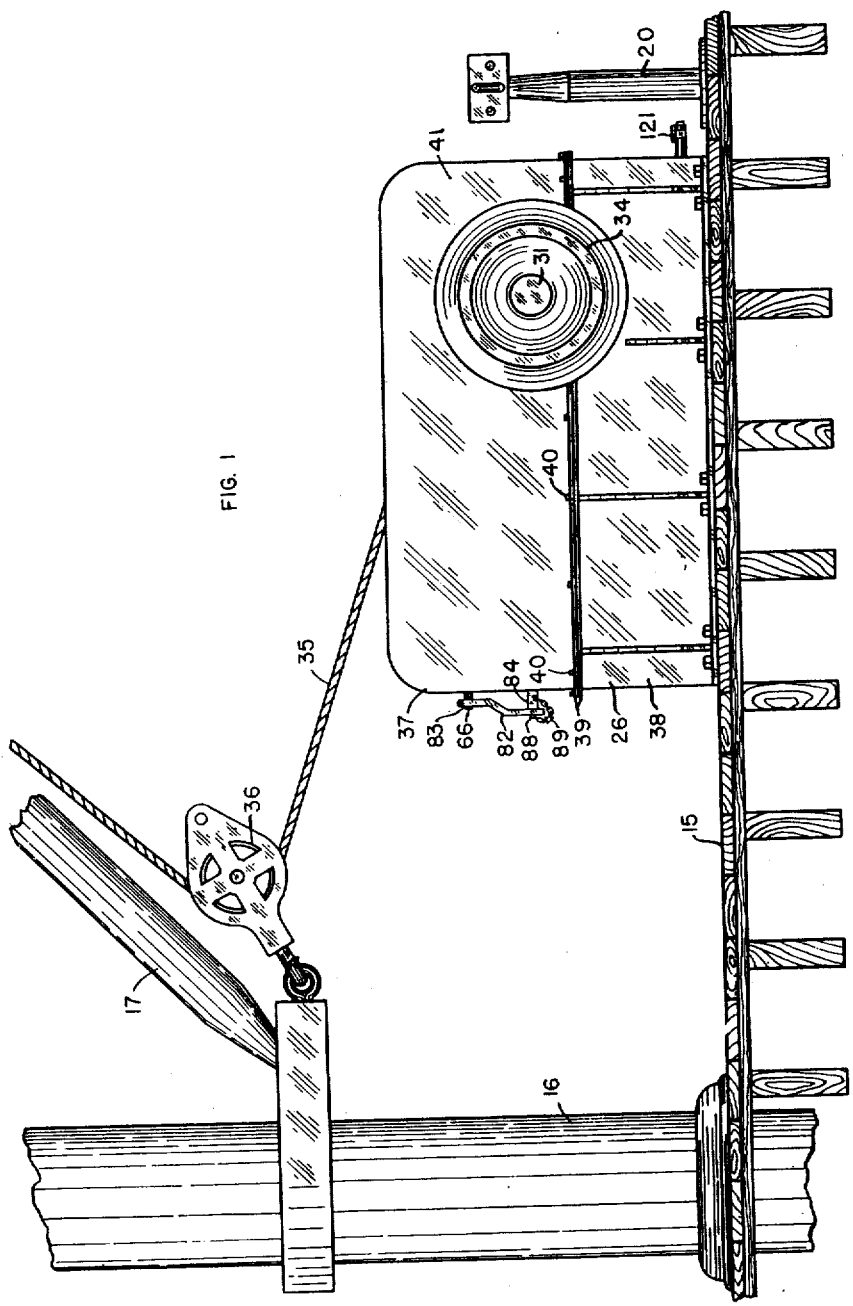
Fig. 1 is a side elevational view of material handling apparatus including the features and characteristics of the invention.
Figure 2:
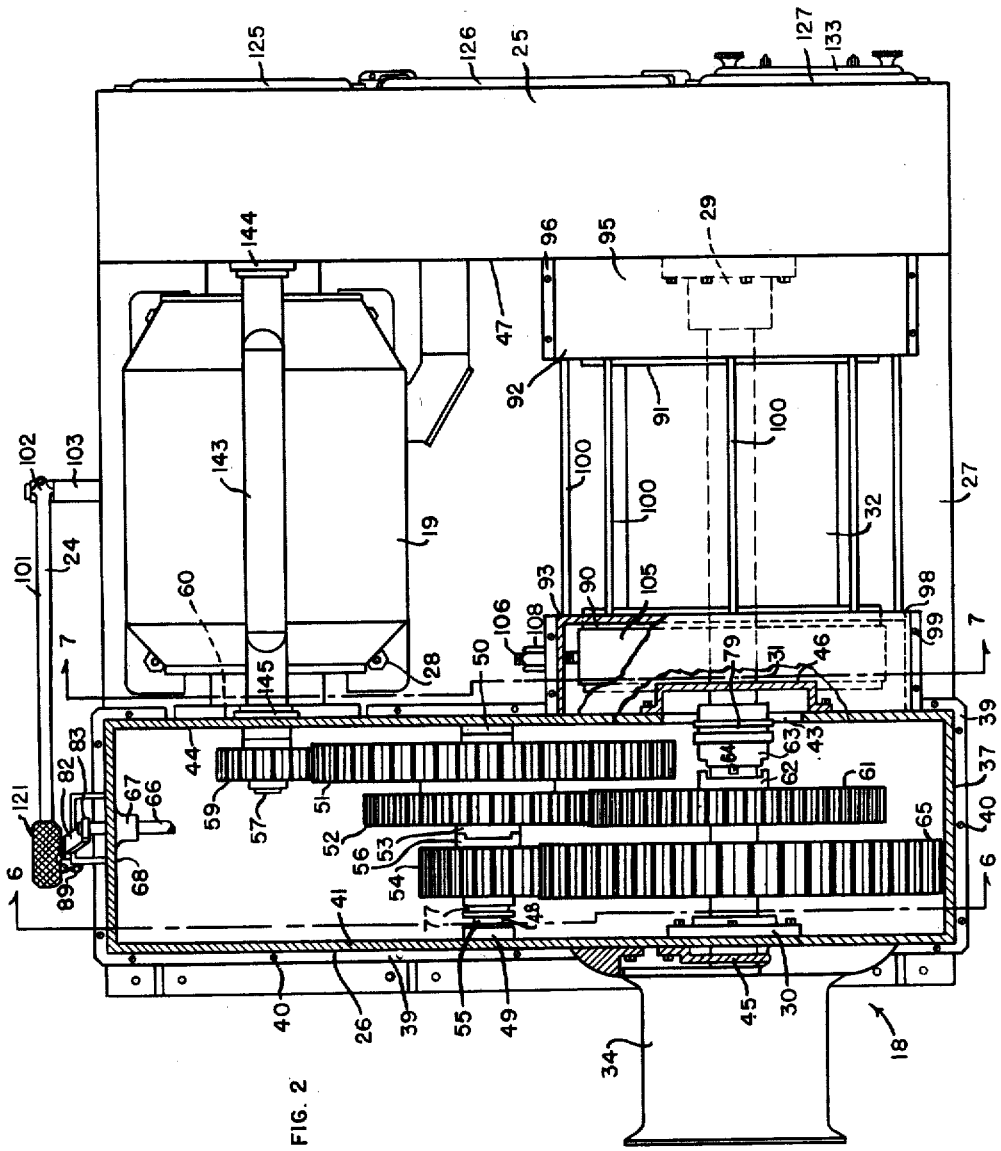
Fig. 2 is an enlarged top plan view, partially sectioned and partially broken away, of the material handling apparatus of Fig. 1.
Figure 3:
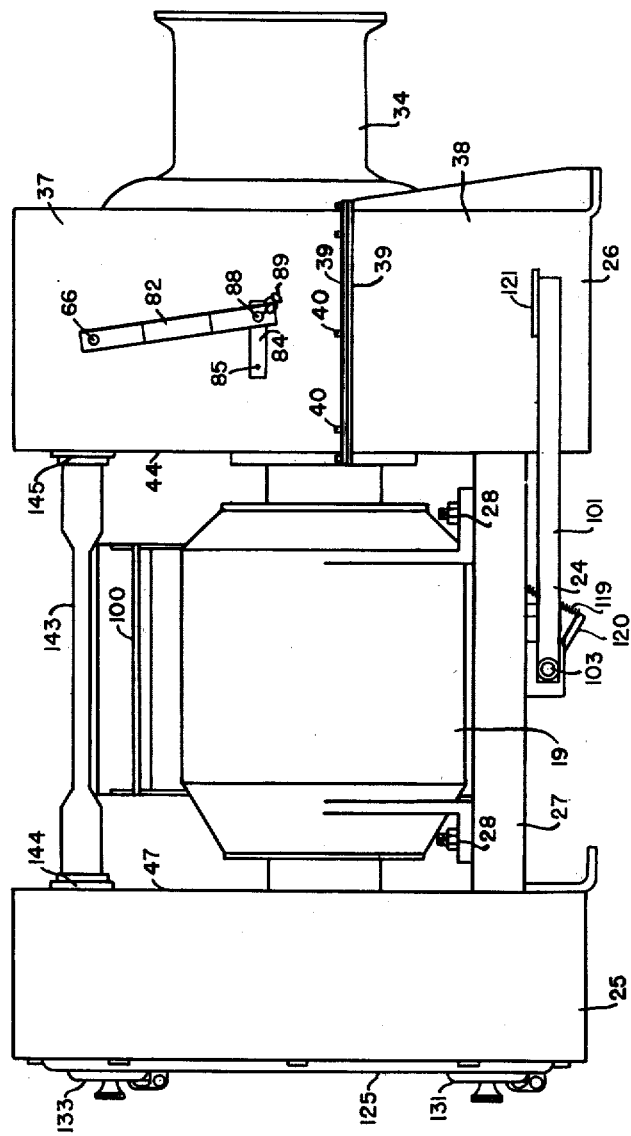
Fig. 3 is an end elevational view of said material handling apparatus as it would appear from the top side of the sheet in Fig. 2.
Figure 4:
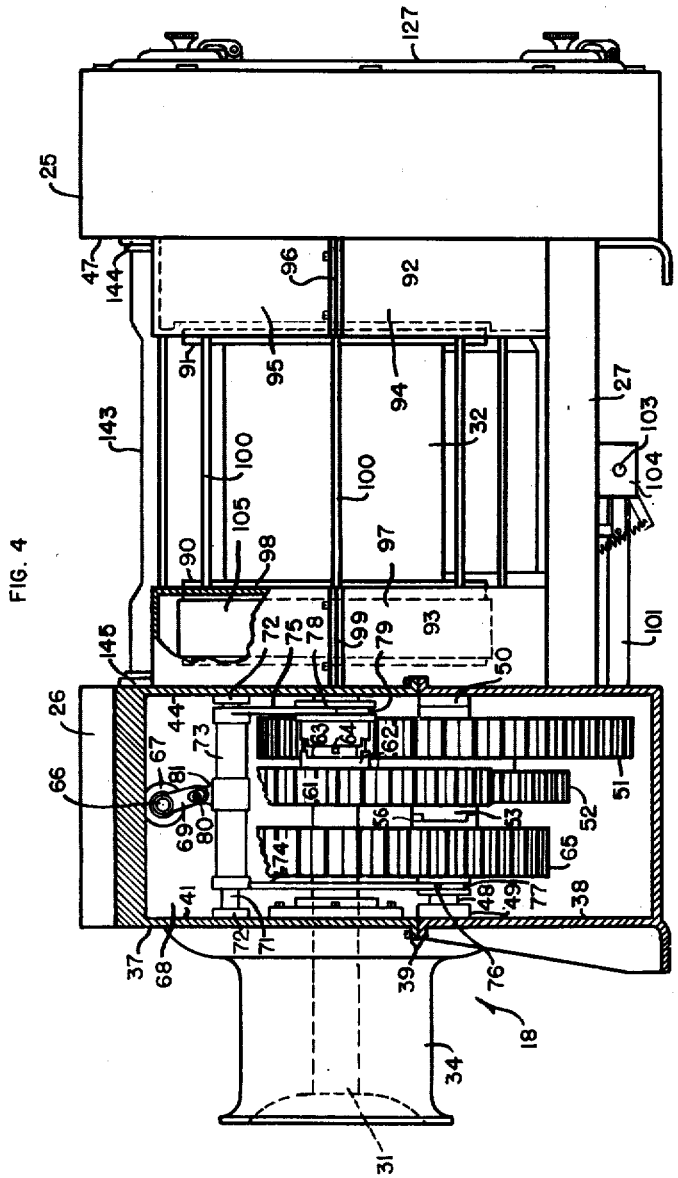
Fig. 4 is an end elevational view, partially sectioned and partially broken away, of the material handling apparatus as it would appear from the bottom side of the sheet in Fig. 2.
Figure 5:
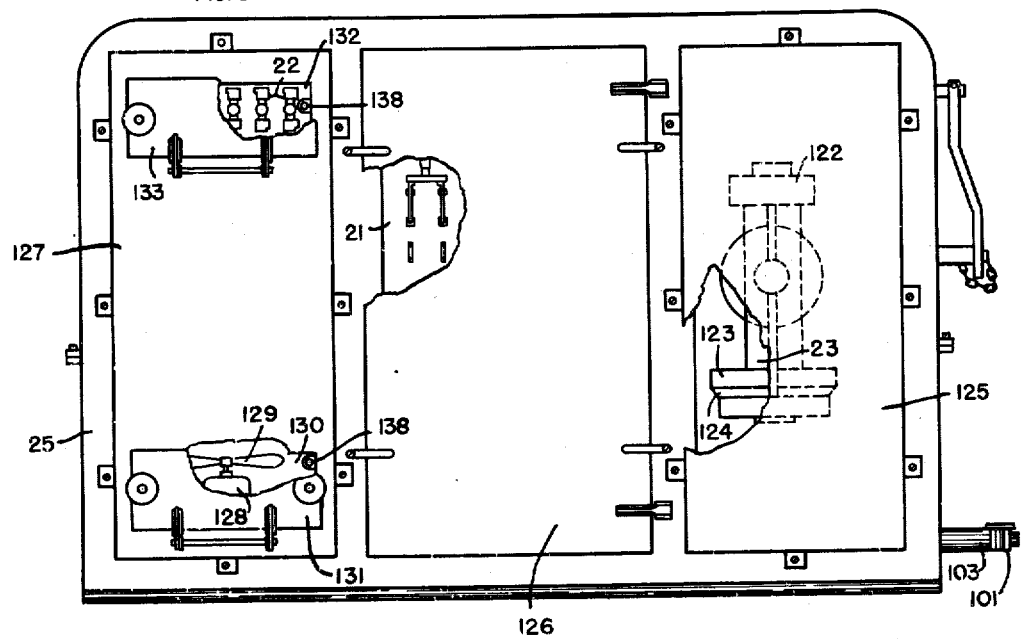
Fig. 5 is an enlarged side elevational view, partially broken away, of said material handling apparatus disclosing the side of the apparatus opposite that shown in Fig. 1.
Figure 6:
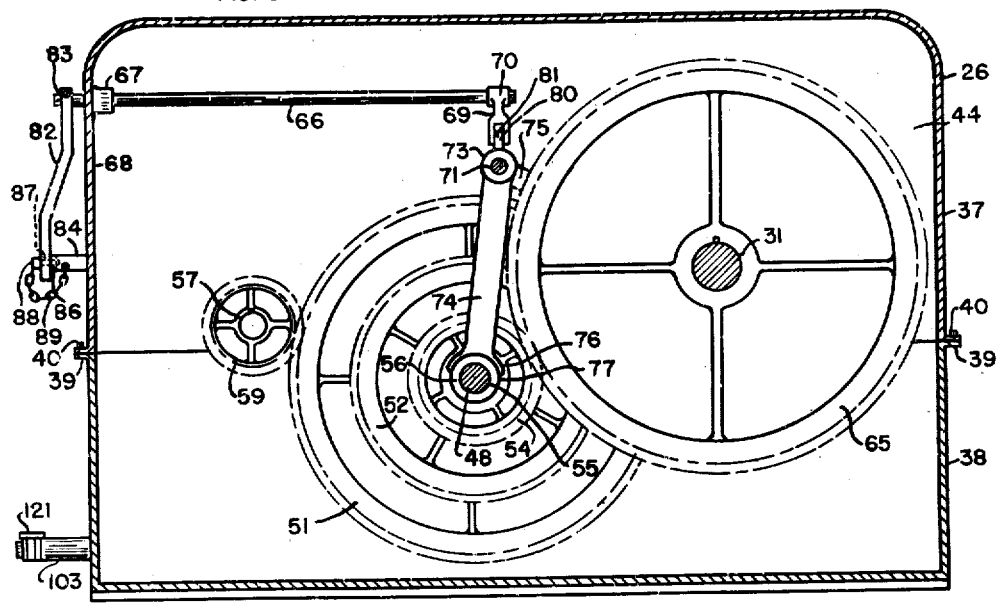
Fig. 6 is a sectional view taken substantially as on line 6—6 in Fig. 2.
Figure 7:
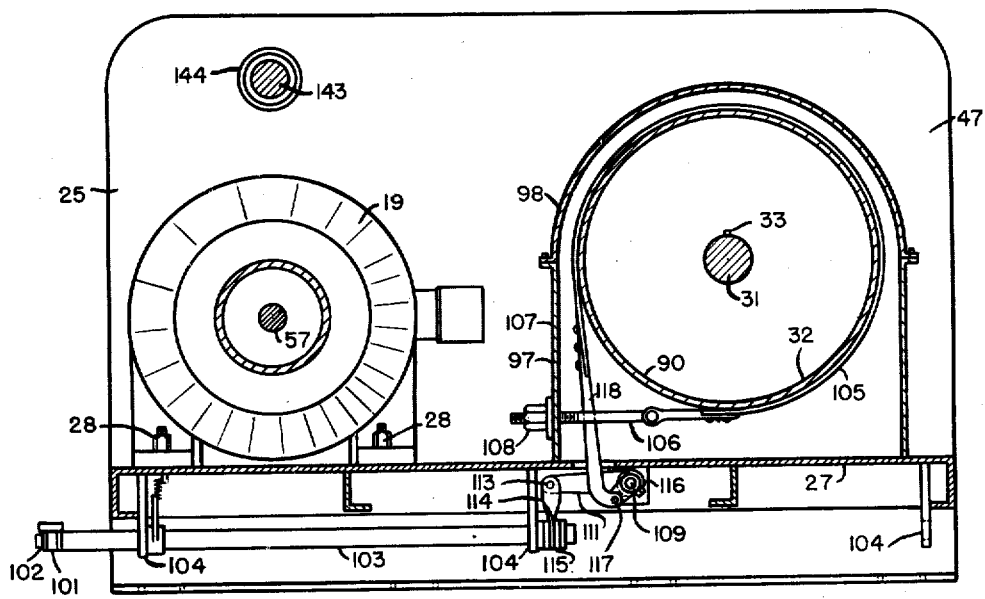
Fig. 7 is a sectional view taken substantially on line 7—7 in Fig. 2.

As disclosed in Fig. 2 the side frame housings 25 and 26 suitably and conveniently include or provide spaced apart, oppositely disposed bearings, denoted 29 and 30, respectively, for a horizontal drum shaft 31 of the cargo winch disposed transversely of the material handling apparatus. A main drum 32 of said cargo winch, situated between the side frame housings 25 and 26 in spaced, parallel relation to the main electric motor 19, is fixed, as at 33, upon the drum shaft 31, and a winch head 34 of the cargo winch, situated at a side of the material handling apparatus, outwardly of the side frame housing 26, is also suitably and conveniently fixed upon said drum shaft 31.

The winch head 34 is adapted to be employed for several purposes, including the purpose of actuating a cable (not shown) for adjusting the boom 17 to elevation where it is desired to locate the boom better to perform a material conveying or moving job required to be done. The main drum 32 is also adapted to be employed for several purposes, by actuation of a cable 35 ridable on said main drum and over a sheave 36 supported upon the mast 16, for raising and lowering, or otherwise moving, material.

As disclosed in Figs. 1, 2, 3, 4, 6, 9, and 10, the side frame housing 26 is composed of upper and lower hollow sections, denoted 37 and 38, respectively. Each of said hollow sections 37 and 38 includes a perpendicular, outwardly extending flange 39 at its open side, and said side frame housing 26 is provided by bolting together, as at 40, said outwardly extending flanges 39, the one against the other. The bearing 30 for the horizontal drum shaft 31 is suitably and conveniently supported upon an exterior vertical side wall 41 of the upper hollow section 37, in surrounding relation to a cut-away part 42 at the lower portion of said exterior vertical side wall 41, and said drum shaft 31 passes freely through a cut-away part 43 at the lower portion of an exterior vertical side wall 44 of said hollow section 37. The cut-away part 42 is suitably and conveniently covered by an oil sealing member or entity 45, and the cut-away part 43 is suitably and conveniently covered by an oil sealing member or entity 46. The bearing 29 is suitably and conveniently supported upon an interior vertical side wall 47 of the side frame housing 25.

A horizontal stub shaft 48, parallel with the drum shaft 31, is situated within the side frame housing 26 and is supported, as at 49 and 50, upon the vertical side walls 41 and 44. The stub shaft 48 rotatably supports a gear unit consisting of a relatively large gear 51 and a somewhat smaller gear 52, fixed against movement longitudinally of said stub shaft, and said gear unit fixedly supports a clutch element 53 disposed adjacent to and at the exterior side of said smaller gear 52. A spur gear 54 rotatably and slidably mounted, as at 55, upon the stub shaft 48 is rigid with a clutch element 56 adapted to be engaged with and disengaged from the clutch element 53. The driven shaft 57 of the main electric motor 19 passes through cut-away parts 58 of the interior side wall 44 and fixedly supports a pinion 59 which is in mesh with the relatively large gear 51. The cut-away parts 58 are suitably and conveniently covered by an oil sealing member or entity 60. The smaller gear 52 is in mesh with a gear 61 rotatable upon and fixed against movement longitudinally of the drum shaft 31. The gear 61 fixedly supports a clutch element 62 disposed adjacent to and at the interior side of the gear 61. A clutch element 63, slidably splined, as at 64, upon the drum shaft 31 is adapted to be engaged with and disengaged from the clutch element 62. The spur gear 54 is in mesh with a relatively large gear 65, larger than the relatively large gear 51 as disclosed, fixed upon the drum shaft 31 and situated between the bearing 30 and the gear 61.

A clutch shifter of the material handling apparatus, for sliding the spur gear 54 along the stub shaft 48 to cause the clutch element 56 selectively to be engaged with and disengaged from the clutch element 53, and for sliding the clutch element 63 along the drum shaft 31 to cause said clutch element 63 to be engaged with and disengaged from the clutch element 62, includes a horizontal shaft 66 suitably and conveniently rotatably mounted, as at 67, in an end wall 68 of the upper hollow section 37 of the side frame housing 26. A crank 69 is fixed, as at 70, to the inner end portion of the shaft 66 and extends downwardly from said shaft 66. A horizontal shifter shaft 71 of the clutch shifter, disposed at right angle relation to the shaft 66, is suitably and conveniently supported, as at 72, upon the vertical side walls 41 and 44 of the upper hollow section 37 of the side frame housing 26. A shifter hub 73 is slidably supported upon the shifter shaft 71 and fixedly carries downwardly extending clutch arms, designated 74 and 75, respectively. The clutch arm 74 fixedly carries a shifter shoe 76 engaged in ordinary manner with a clutch shifter element 77 for the clutch 56, and the clutch arm 75 fixedly carries a shifter shoe 78 engaged in ordinary manner with a clutch shifter element 79 for the clutch element 63. The crank 69 is pivoted, as at 80, to an ear 81 rigid with the shifter hub 73. A hand lever 82 for rotating the shifter shaft 66 is situated at the outer side of the end wall 68. The shaft 66 passes outwardly through said end wall 68, and the hand lever 82 is fixed, as at 83, upon the outer end portion of said shaft 66. A retainer 84 for the hand lever 82, suitably and conveniently fixed up against the outer surface of the end wall 68, includes spaced apart openings, denoted 85 and 86, and the end portion of said hand lever 82 spaced from the shaft 66 includes an opening 87 adapted selectively to be alined with the openings 85 and 86. A headed pin 88 upon a chain 89 fixed to the retainer 84 is adapted selectively to be inserted into the openings 85, 87, or 86, 87, either to cause the clutch elements 53, 56 to be engaged and the clutch elements 62, 63 to be disengaged, or to cause said clutch elements 53, 56 to be disengaged and said clutch elements 62, 63 to be engaged.

It will be evident that lower speed rotation of the main drum 32 and the winch head 34 of the cargo winch 18 will be accomplished when the clutch elements 53, 56 are engaged and the clutch elements 62, 63 are disengaged, and that higher speed rotation of said main drum 32 and said winch head 34 will be accomplished when said clutch elements 62, 63 are engaged and said clutch elements 53, 56 are disengaged, by energization of the main electric motor 19. For lower speed operation, the drive of the main drum and winch will be through the instrumentality of the motor shaft 57, the pinion 59, the gear 51, the clutch 53, 56, the spur gear 54, the gear 65 and the drum shaft 31. During lower speed operation, the gear 52 will cause the gear 61 and the clutch element 62 to rotate idly upon the drum shaft 31. For higher speed operation, the drive of the main drum and winch head will be through the instrumentality of said motor shaft 57, said pinion 59, said gear 51, the gear 52, the gear 61, the clutch 62, 63 and said drum shaft 31. During higher speed operation, the gear 65 will cause the spur gear 54 and the clutch element 56 to rotate idly upon the stub shaft 48.

The main drum 32 includes enlarged cylindrical end portions, represented 90 and 91, each rotatably mounted in a two piece guard, denoted 92 and 93. As disclosed, the two piece guard 92 consists of a lower part or element 94, at the lower side of the main drum, rigid with the bed 27, and an upper part or element 95, at the upper side of said main drum, detachably connected, as at 96, to said lower part or element 94. Likewise, the two piece guard 93 consists of a lower part or element 97, at the lower side of the main drum, rigid with said bed 27, and an upper part or element 98, at the upper side of said main drum, detachably connected, as at 99, to said lower part or element 97. The two piece guards 92, 93, or, more accurately, the lower and upper parts or elements, respectively, of said two piece guards, are interconnected by guard rails 100 for cable 35 upon the main drum 32. The guard rails 100 are disposed in spaced relation to each other about the main drum 32, as well as in spaced relation to said main drum. The upper parts or elements 95 and 98 of the two piece guards 92 and 93, respectively, and the guard rails 100 interconnecting said upper parts or elements are evidently constituted as a single entity.

The enlarged cylindrical end portion 90 of the main drum 32 constitutes an integral brake drum of the main drum 32, and the manual brake 24 is adapted to the purpose of causing said brake drum 90 to be engaged thus to cause the main drum 32 and the winch head 34 to be brought to rest when this is intentional. Said manual brake 24 includes, in addition to the integral brake drum 90, a foot lever 101 secured, as at 102, to a horizontal shaft 103 rotatably supported, as at 104, upon the underside of the bed 27, a brake band 105 in surrounding relation to the brake drum 90, and an operative connection between the shaft 103 and the brake band 105. Said brake band 105 is situated within the two piece guard 93, and the upper parts or elements 95 and 98 are detachable from the lower parts or elements 94 and 97 of the two piece guards 92 and 93 to the purpose that the manual brake 24 can be readily and easily serviced. A yoke bolt 106, suitably and conveniently secured to one end portion of the brake band 105, passes freely through an interior vertical wall 107 of the lower part or element 97 and threadably receives an adjusting nut 108 situated outside of the two piece guird 93 up against said interior vertical wall 107. The adjusting nut 108, together with the interior vertical wall 107, constitutes an adjustable anchor for the brake band 105 which is situated to be readily and easily accessible. Clearly, the overall length of said brake band 105 selectively can be increased and decreased by turning adjustment of the nut 108. A horizontal shaft 109, at right angle relation to the horizontal shaft 103, is rotatably supported, as at 110, upon the underside of said bed 27. A crank 111 fixed, as at 112, upon the horizontal shaft 109 is pivoted, as at 113, to a short lever 114 fixed, as at 115, upon the inner end portion of the horizontal shaft 103, and a crank 116 fixed to said horizontal shaft 109 is pivoted, as at 117, to an attachment piece 118 upon the end portion of the brake band 105 which is opposite the yoke bolt 106 and the adjusting nut 108. The construction and arrangement are such that the integral brake drum 90 will be engaged by the brake band 105 upon depression of the foot lever 101 and that said brake band will be removed from engagement with said integral brake drum, in response to actuation of a coil spring 119 secured to an arm 120 upon the horizontal shaft 103 and to the bed 27, upon release of said foot lever 101.

Figure 8:
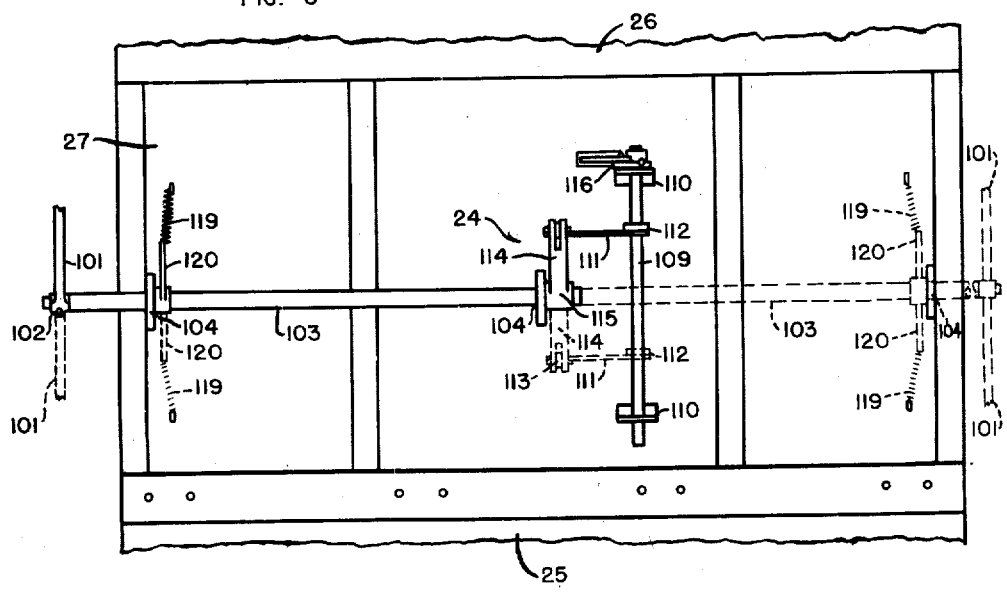
Fig. 8 is an enlarged fragmentary bottom plan view of the material handling apparatus.
Figure 9:
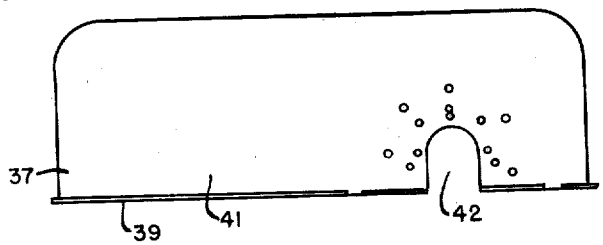
Fig. 9 is an exterior side elevational view, on a reduced scale, of a frame member of a side frame housing of said material handling apparatus.
Figure 10:
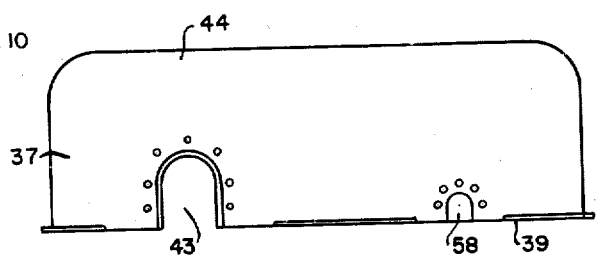
Fig. 10 is an interior side elevational view of the frame member disclosed in Fig. 9.

As shown, the foot lever 101 extends along an end portion of the material handling apparatus, and an operating piece 121 for said foot lever is situated adjacent a corner of said apparatus. In some installations, it is desirable to have the operating piece 121 situated adjacent a preferred corner of the apparatus. For example, said operating piece 121 is situated in Fig. 1 at the end of the apparatus adjacent the controller 20 and is situated in Fig. 6 at the opposite end of said apparatus. Provision is included for selectively situating the operating piece 121 adjacent any corner of the apparatus where desired or preferred. In Fig. 8 of the drawings, the full line disclosure of the manual brake parts agrees with the disclosure of Figs. 2 and 6, and the dotted line disclosures show how the operating piece 121 selectively can be situated adjacent any one of the other three corners of the apparatus. To situate said operating piece 121 as in Fig. 1, the crank 111 and the short lever 114 are placed as in dotted lines in Fig. 8, and the foot lever 101 at the left, the coil spring 119 at the left and the arm 120 at the left are also placed as in dotted lines in said Fig. 8. To situate the operating piece 121 adjacent the corner of the apparatus opposite that at which shown in Fig. 1, the horizontal shaft 103 is situated in the dotted line position as in Fig. 8 and the crank 111, the short lever 114, the foot lever 101, the coil spring 119 and the arm 120 are appropriately placed, altered or adjusted. To situate said operating piece 121 adjacent the corner of the apparatus opposite that at which shown in Fig. 6, said horizontal shaft 103 is situated in the dotted line position as in said Fig. 8 and the crank, etc., are appropriately placed, altered or adjusted, as will be understood from the description already given. Stated briefly, the construction and arrangement is adapted to provide for any selected one of four different possible arrangements of the operating piece 121 of the foot lever 101, including a position for said operating piece adjacent each of the corners of the material handling apparatus.

The side frame housing 25 is constituted as a hollow rectilinear entity including three sections, one section containing the automatic brake 23, a second section containing the control panel 21 and a third section containing the resistors 22.

The driven shaft 57 of the main electric motor 19 passes through the interior vertical side wall 47 of the side frame housing 25. A braking element of the automatic brake 23 is denoted 122, a frame of the automatic brake is represented 123 and solenoid actuated devices 124 are for engaging and releasing the braking element 122. The automatic brake 23 is of ordinary and well known construction. It is adapted to be electrically controlled selectively to cause the main electric motor 19 to be brought to rest and released for operation. An openable door 125 covers the section of said side frame housing 25 containing the automatic brake 23, thus to render said automatic brake accessible for servicing.

The control panel 21 is situated in the intermediate section of the side frame housing 25, and is accessible by way of an openable door 126. Said control panel is supported directly upon a vertical wall of said side frame housing 25.

The resistors 22 are situated in the end section of the side frame housing 25 opposite the end section containing the automatic brake 23, and said resistors are accessible by way of an openable door 127. The resistors are supported directly upon a vertical wall of said side frame housing 25.

All of the three sections of the side frame housing 25 are water-tight when the doors 125, 126 and 127 are in closed position.

A construction and arrangement is included for causing the section of the side frame housing 25 containing the resistors 22 to be opened up, as well as for causing said mentioned section and said resistors to be ventilated, thus to cause heat to be removed from the resistors and from said side frame housing 25.

A blower motor 128 is suitably and conveniently supported at the interior of a lower portion of the section of the side frame housing 25 which contains said resistors 22, and the driven shaft of the blower motor 128 fixedly supports a blower or fan 129 also situated within a lower portion of said section containing the resistors. As shown, the blower or fan 129 is positioned so that it can, when in operation, cause air to travel against and over said resistors 22. The door 127 includes an opening 130, of some considerable area, at its lower portion adjacent lowermost resistors 22 and the blower motor 128 and the blower or fan 129, which opening 130 is normally covered by an adjustable lower closure element 131, and said door 127 also includes an opening 132, of some considerable area, at its upper portion adjacent uppermost resistors 22, which opening 132 is normally covered by an adjustable upper closure element 133.

The adjustable lower and upper closure elements 131 and 133 are adapted selectively to be moved to open and to closed positions. Obviously, when the blower or fan 129 is in operation while said adjustable lower and upper closure elements 131 and 133 are in open condition air will be forced through the section of the side frame member 25 containing the resistors 22 and cause said resistors and said mentioned section to be cooled.

The material handling apparatus incorporates a more or less complicated electrical system, not necessary to be disclosed and described in detail, including a multiplicity of lead wires to and from the main electric motor 19, the controller 20, the control panel 21, the resistors 22, the automatic brake 23 and the blower motor 128. Evidently, the bulk of the necessary electrical equipment, especially terminals, will be enclosed in the water-tight side frame housing 25, and for this reason the wiring and conduit required will be substantially a minimum.

The electrical system of the material handling apparatus incorporates a construction and arrangement for insuring that the main electric motor 19 possibly can be energized, thus to be set in operation to actuate the main drum 32 and the winch head 34, only when the adjustable lower and upper closure elements 131 and 133 are in open condition. And, too, said electrical system desirably will include a construction and arrangement for insuring that the blower motor 128 will be energized, thus to actuate the blower or fan 129, at all times when said adjustable closure elements 131 and 133 are in open condition, and will be de-energized at all times when the adjustable closure elements are in closed condition.

Incoming wires 134 and 135 are from a source (not shown) of electrical energy.

A lead wire 136, extending from the incoming wire 134 and including a pair of separate two point break push button type switches each having spaced apart fixed contacts 137, 137 and a movable bridging contact 138, connects to a double pole switch 139, and a lead wire 140, extending from the incoming wire 135, also connects to said double pole switch 139. Lead wires 141, 141 extend from the double pole switch 139 to the blower motor 128, and lead wires 142, 142 extend from the lead wires 141, 141 to the control panel 21.

The adjustable lower and upper closure elements 131 and 133 are adapted to retain the movable bridging contacts 138, 138 disengaged from the fixed contacts 137, 137 and 137, 137 at all times when said lower and upper closure elements are in closed position, and said contacts 137, 138, 137 and 137, 138, 137 are adapted to become engaged whenever the closure elements 131 and 133 are moved to open position.

As illustrated and described, the two point break limit switches 137, 138, 137 and 137, 138, 137 are incorporated in the power circuit, including the incoming wires 134, 135, the lead wires 136, 140 and the lead wires 141, 141, 142, 142, of the material handling apparatus, and thus the control panel 21 cannot be energized, or made live, unless both of said limit switches 137, 138, 137 and 137, 138, 137 are closed. The main electric motor 19 is connected in the power circuit through and only through the medium of the control panel 21. Hence, said main electric motor can be energized only when both of the limit switches 137, 138, 137 and 137, 138, 137 are in closed condition.

It is obvious that the blower motor 128 will be energized at all times when the limit switches 137, 138, 137 and 137, 138, 137 are in closed condition and will be de-energized at all times when said limit switches are in open position.

The double pole switch 139 is, of course, a manual on and off switch for both the main electric motor 19 and the blower motor 128.

A combination rope guard and brace 143 of the material handling apparatus extends longitudinally of the main electric motor 19 and is as disclosed in Fig. 2 situated directly above said main electric motor. One end of the rope guard and brace 143 is rigid, as at 144, with the interior vertical side wall 47 of the side frame housing 25, and the other end of said rope guard and brace is rigid, as at 145, with the interior vertical side wall 44 of the upper section 37 of the side frame housing 26. The rope guard and brace serves two main purposes. It prevents the cable, such as 35, from dropping onto and damaging the main electric motor 19, and it forms a rigid support between the side frame housings 25 and 26 situated above and in spaced relation to the bed 27 of the material handling apparatus.

Attention is called to the fact that the side frame housing 25 contains the major portion of the electrical equipment of the material handling apparatus and the side frame housing 26 contains the major portion of the mechanical equipment of said apparatus.

Material handling apparatus of the general nature as illustrated and described has heretofore included, for each cargo winch, such as 18, to be operated, each of an operating electric motor, such as 19, a controller, such as 20, a control panel, such as 21, a set of resistors, such as 22, and an automatic brake, such as 23, as well as additional elements required to the production of an operative structure. In many instances, the control panel and set of resistors have been incorporated in a separate deck house, or separate deck houses, occupying valuable deck space. The placing of the control panel 21 and the resistors 22 within the water-tight housing 25 eliminates the necessity of providing separate deck houses for said control panel and resistors. The water-tight housing 26, in addition to serving as a container and protection for the gearing of the material handling apparatus, also serves as means cooperating in the support of said drum shaft 31, said main drum 32 and said winch head 34. The construction as a whole is simple and compact and designed to occupy but a minimum of deck space. By elimination of necessity for deck houses, the cost of building a cargo transporting vessel including the material handling apparatus of the invention is obviously reduced.

Inasmuch as the bulk of the electrical equipment, including terminals, is contained within the water-proof housing 25, a considerable amount of wiring and conduit as necessitated with apparatuses of the prior art employing deck houses, and the expense of said wiring and conduit and its installation, is eliminated.

Desirably, the side frame housings 25 and 26 and the bed 27 may be made of steel plate. When said side frame housings and bed are so constructed, the material handling apparatus will not only be rendered stronger than would otherwise be the case, but said material handling apparatus will also be of considerably less weight than if it incorporated an entity, or entities, composed in the main of casting. The cargo winch 18 has maximum strength and rigidity and minimum weight. The side frame housings 25 and 26 and the bed 27, while quite strongly constructed, are of inconsiderable weight.

When the material handling apparatus is out of use, the section of the side frame housing 25 containing the resistors 22 will be completely closed. The adjustable lower and upper closure elements 131 and 133 will be situated in closed condition when the material handling apparatus is intended to be inoperative, as, for example, when a cargo transporting vessel equipped with said material handling apparatus is in transit. When it is desired that the material handling apparatus be put to work, as to load or unload the cargo transporting vessel, it will be necessary first to move the adjustable lower and upper closure elements 131 and 133 to open condition. Otherwise, the main electric motor 19 cannot be energized. Upon movement of said lower and upper closure elements 131 and 133 to open condition, said main electric motor is rendered capable of being selectively inoperative or connected in the power circuit to be operated at predetermined speed, through the instrumentality of cooperating mechanism of the controller 20, the control panel 21 and the resistors 22, in well known manner.

In the disclosed embodiment of the invention, the blower motor 128 will be inoperative at all times when the closure elements 131 and 133 are in closed condition and will be operative at all times when said closure elements are in open condition, provided the double pole switch 139 is closed. Evidently, the blower motor 128 will be incapable of operation while said double pole switch 139 is open even though the closure elements 131 and 133 be in open condiiton, and movement of the double pole switch to open position will also render the main electric motor 19 incapable of operation.

With respect to Fig. 12 of the drawings, 146 denotes the deck of a vessel, 147 a mast stationarily situated upon said deck, and 148 represents a boom suitably and conveniently pivotally supported, in ordinary or preferred manner, upon said mast.

The material handling apparatus of said Fig. 12 includes all of the elements of and is essentially like the material handling apparatus hereinbefore described, but is of variant structure in particulars as now to be set forth.

A winch bed construction 149 is supported upon a sub-base 150 on the deck 146, and a controller 151, similar to the controller 20 and for the same purposes, is supported upon said deck 146 at location adjacent the cargo winch.

The control panel, the resistors and the automatic brake of the material handling apparatus of Fig. 12 are all suitably and conveniently situated and supported within a water-tight side frame housing 152, equivalent to the side frame housing 25, and the structure includes a second side frame housing 153, equivalent to the side frame housing 26.

The side frame housing 153 is supported directly upon the winch bed construction 149. More explicitly, said side frame housing 153 is composed of upper and lower hollow sections, denoted 154 and 155, respectively. The lower hollow section 155 is constituted as an integral part of the winch bed construction 149, and each of said hollow sections 154 and 155 includes a perpendicular, outwardly extending flange at its open side. The side frame housing 153 is provided by bolting together said outwardly extending flanges, the one against the other. The upper and lower hollow sections 154 and 155 are equivalent to and perform substantially the same service as the upper and lower hollow sections of the side frame housing 26.

The side frame housing 152 is rigidly secured up against a side surface of the winch bed construction 149 to be in spaced, parallel relation to the side frame housing 153, and said side frame housing 152 is constituted as a hollow rectilinear entity including three sections, one for containing an automatic brake, a second for containing a control panel and a third for containing resistors.

A main electric motor, equivalent to the main electric motor 19, of the material handling apparatus of Fig. 12 is situated between the side frame housings 152 and 153 and is supported in any suitable and convenient manner upon a portion denoted 156 of the winch bed construction 149.

Said winch bed construction 149 suitably and conveniently includes or provides spaced apart, oppositely disposed bearings, denoted 157 and 158, equivalent to the bearings 29 and 30, for a horizontal drum shaft, equivalent to the horizontal drum shaft 31, of the cargo winch disposed transversely of the material handling apparatus. A main drum 159 of said cargo winch, situated between the side frame housings 152 and 153 in spaced, parallel relation to the main electric motor, is suitably and conveniently fixed upon the drum shaft, and a winch head 160, situated at a side of the material handling apparatus, outwardly of the side frame housing 153, is also suitably and conveniently fixed upon said drum shaft. The horizontal drum shaft passes through cut-away parts, equivalent to the cut-away parts 42 and 43 shown in Figs. 9 and 10, of the side frame housing 153, and said cut-away parts are suitably and conveniently covered by oil sealing members or entities equivalent to the oil sealing member or entities 45 and 46.

The side frame housing 153 contains and suitably and conveniently supports elements similar to and operative in substantially the same manner as the elements contained in the side frame housing 26 and hereinbefore described, and the elements within said side frame housing 153 cooperate with related elements of the material handling apparatus in the manner as has been set forth.

The main drum includes enlarged cylindrical end portions each rotatably mounted in a two piece guard, denoted 161 and 162, equivalent to the two piece guards 92 and 93 and for the same purpose. Upper parts or elements of the two piece guards 161 and 162 are in fact constituted as a single entity, denoted 163 in Figs. 17 and 18.

A manual brake 164 of the material handling apparatus of Fig. 12 is equivalent to the manual brake 24 before described and is adapted to the purpose of controlling the brake drum in substantially the manner as has been set forth.

The driven shaft of the main electric motor of the material handling apparatus of Fig. 12 enters the side frame housing 152 and is associated with an automatic brake, such as 23, in substantially the manner as described in connection with the driven shaft 57. The side frame housing 152 and its contents and appurtenances may in all respects be similar to the side frame housing 25 and its contents and appurtenances.

A combination rope guard and brace 165 of the material handling apparatus of Fig. 12 extends longitudinally of the main electric motor and is situated above said main electric motor at the side of the motor opposite the brake drum. The rope guard and brace 165 extends between the side frame housings 152 and 153 and is equivalent to the rope guard and brace 143.

What is claimed is:

1. In material handling apparatus including an entity to be actuated, spaced apart housings, one of said spaced apart housings including a first, a second and a third separate section, means rotatably supporting said entity between said spaced apart housings, an operating electric motor for said entity between and rigid with said spaced apart housings, an automatic brake for said operating electric motor situated in said first separate section of said one housing, means including a control panel and resistors situated, respectively, in said second and third separate sections of said one housing for controlling said operating electric motor, means for providing openings through said third separate section containing said resistors, a blower for ventilating said third separate section and said resistors, and a driving connection between said operating electric motor and said entity situated in the other of said spaced apart housings.

2. In material handling apparatus including a drum to be actuated, spaced apart members, a drum shaft carrying said drum rotatably supported between said spaced apart members, a two piece guard at the inner side of each of said spaced apart members, each of said two piece guards consisting of a lower element rigid with the spaced apart members and an upper element detachably connected to said lower element, guard rails in spaced relation to said drum interconnecting the lower elements and the upper elements, respectively, of said two piece guards, said drum having enlarged cylindrical end portions situated in said two piece guards and one of said enlarged cylindrical end portions being constituted as a brake drum, a brake band upon said brake drum and within the two piece guard having said brake drum, and means for causing said brake band to be engaged against and released from said brake drum.

3. In material handling apparatus including a drum to be actuated, spaced apart members, a drum shaft carrying said drum rotatably supported between said spaced apart members, a two piece guard at the inner side of each of said spaced apart members, each of said two piece guards consisting of a lower element rigid with the spaced apart members and an upper element detachably connected to said lower element, said drum having enlarged cylindrical end portions situated in said two piece guards and one of said enlarged cylindrical end portions being constituted as a brake drum, a brake band upon said brake drum and within the two piece guard having said brake drum, a yoke bolt secured to said brake band and extending outwardly through an element of said two piece guard containing said brake band, an adjusting nut upon said yoke bolt and engaged against an outer surface of said last mentioned two piece guard, and means for causing said brake band to be engaged against and released from said brake drum.

4. In material handling apparatus including a drum to be actuated, spaced apart members, a drum shaft carrying said drum rotatably supported between said spaced apart members, a two piece guard at the inner side of each of said spaced apart members, each of said two piece guards consisting of a lower element rigid with the spaced apart members and an upper element detachably connected to said lower element, said drum having enlarged cylindrical end portions situated in said two piece guards and one of said enlarged cylindrical end portions being constituted as a brake drum, a brake band upon said brake drum and within the two piece guard having said brake drum, a yoke bolt secured to said brake band and extending outwardly through the lower element of said two piece guard containing said brake band, an adjusting nut threaded upon said yoke bolt and engaged against an outer surface of the lower element of said last mentioned two piece guard, and means secured to a portion of said brake band in spaced relation to said yoke bolt for causing the brake band to be engaged against and released from said brake drum.

5. In material handling apparatus including an entity to be actuated, spaced apart housings, means rotatably supporting said entity between said spaced apart housings, an operating electric motor for said entity between and rigid with said spaced apart housings, means including a control panel and resistors situated, respectively, in separate sections of one of said spaced apart housings for controlling said operating electric motor, means for providing openings through the section containing said resistors, a blower for ventilating said mentioned section and said resistors, and a driving connection between said operating electric motor and said entity situated in the other of said spaced apart housings.

6. In material handling apparatus including a drum to be actuated, spaced apart members, a drum shaft carrying said drum rotatably supported between said spaced apart members, a two piece guard at the inner side of each of said spaced apart members, each of said two piece guards consisting of a lower element rigid with the spaced apart members and an upper element detachably connected to said lower element, guard rails in spaced relation to said drum interconnecting the lower elements of said two piece guards, said drum having enlarged cylindrical end portions situated in said two piece guards and one of said enlarged cylindrical end portions being constituted as a brake drum, a brake band upon said brake drum and within the two piece guard having said brake drum, and means for causing said brake band to be engaged against and released from said brake drum.

7. In material handling apparatus including an entity to be actuated, spaced apart housings, means rotatably supporting said entity between said spaced apart housings, an operating electric motor for said entity between and rigid with said spaced apart housings, means including resistors situated in one of said spaced apart housings for controlling said operating electric motor, means for providing openings through said housing containing said resistors, a blower for ventilating said resistors, and a driving connection between said operating electric motor and said entity situated in the other of said spaced apart housings.

8. In material handling apparatus including an entity to be actuated, spaced apart housings, one of said spaced apart housings including a first, a second and a third separate section, means rotatably supporting said entity between said spaced apart housings, an operating electric motor for said entity between and rigid with said spaced apart housings, an automatic brake for said operating electric motor situated in said first separate section of said one housing, means including a control panel and resistors situated, respectively, in said second and third separate sections of said one housing for controlling said operating electric motor, and a driving connection between said operating electric motor and said entity situated in the other of said spaced apart housings.

KENNETH F. POTTER.

REFERENCES CITED

The following references are of record in the file of this patent:

UNITED STATES PATENTS

| Number | Name | Date |
| --- | --- | --- |
| 780,368 | Metten | Jan. 17, 1905 |
| 1,192,322 | Jenkins | July 25, 1916 |
| 1,863,401 | Faulkner | June 14, 1932 |
| 1,938,071 | Hummel | Dec. 5, 1933 |
| 2,116,013 | Carson et al. | May 3, 1938 |
| 2,240,737 | Young | May 6, 1941 |
| 2,317,171 | Berby | Apr. 20, 1943 |
| 2,352,395 | Ljungkull | June 27, 1944 |
| 2,379,858 | Banzhaf et al. | July 10, 1945 |

FOREIGN PATENTS

| Number | Country | Date |
| --- | --- | --- |
| 217,007 | Great Britain | June 12, 1924 |